No. 806,069. PATENTED NOV. 28, 1905.
G. M. DEPEW.
MACHINE FOR GATHERING HAY, &c.
APPLICATION FILED MAR. 1, 1902.
5 SHEETS—SHEET 5.
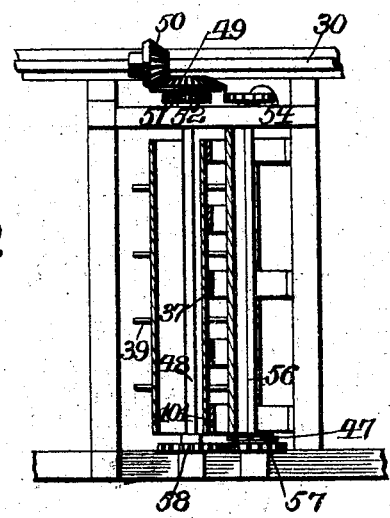
Fig. 9.
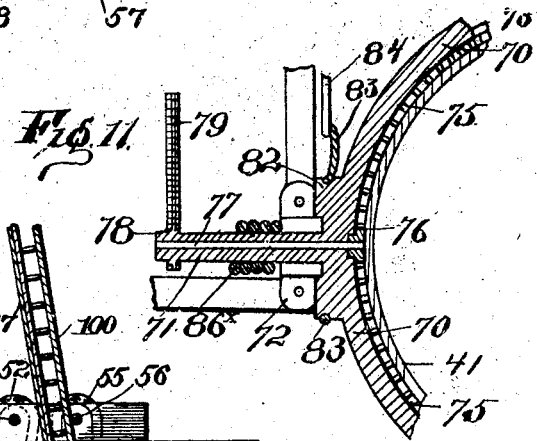
Fig. 10.
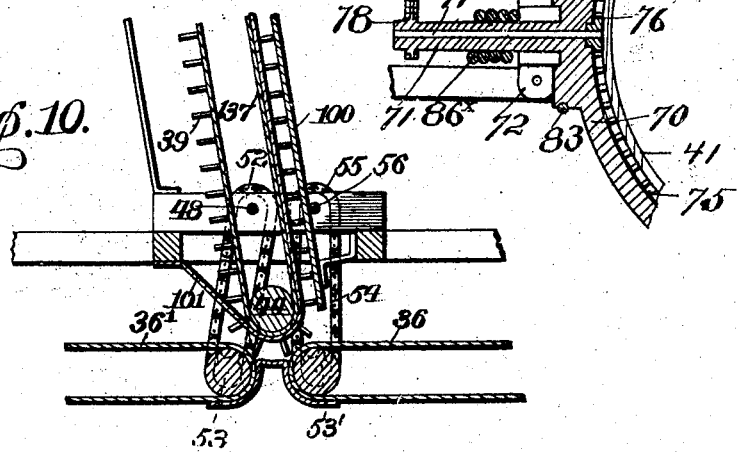
Witnesses. Inventor.

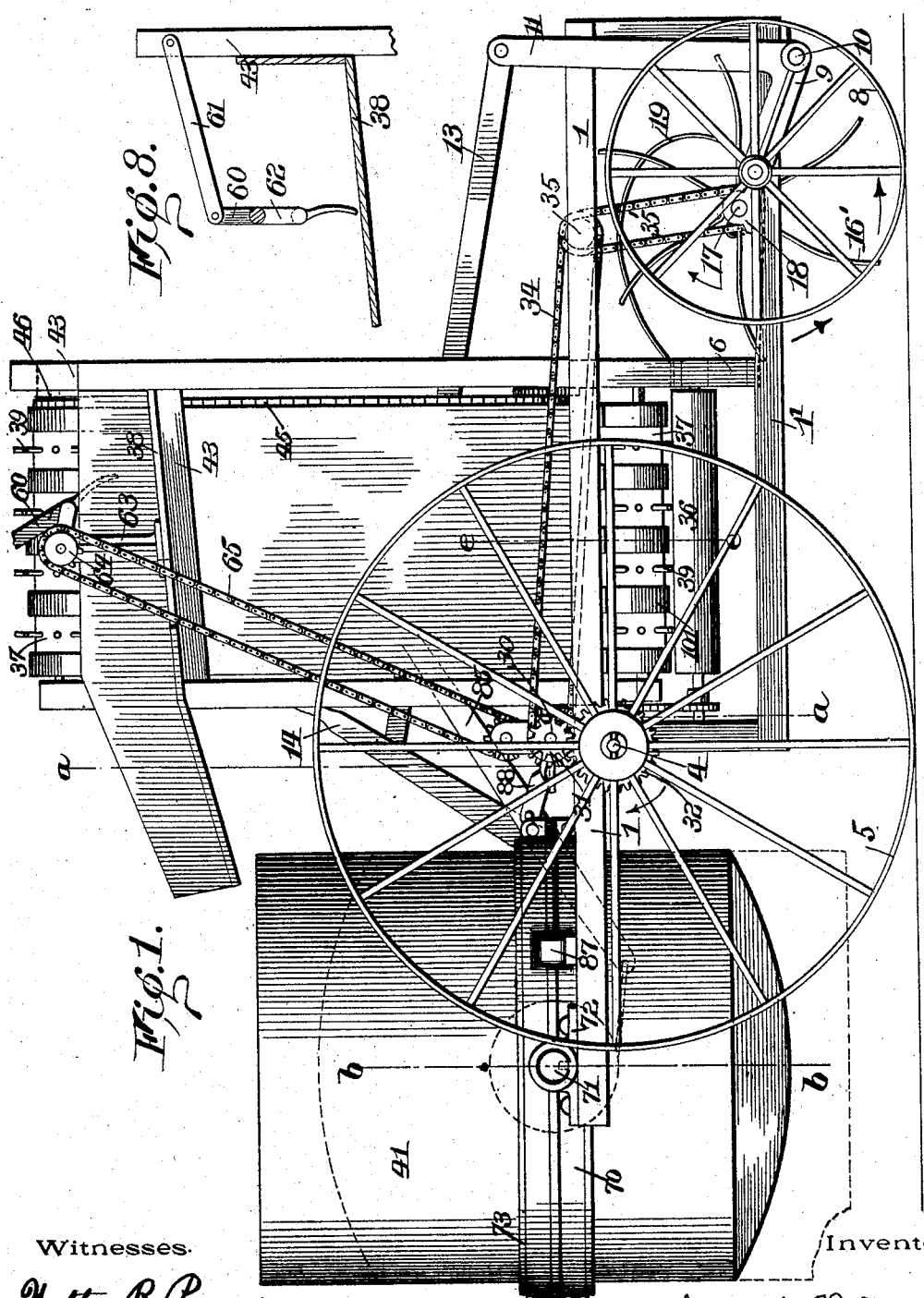

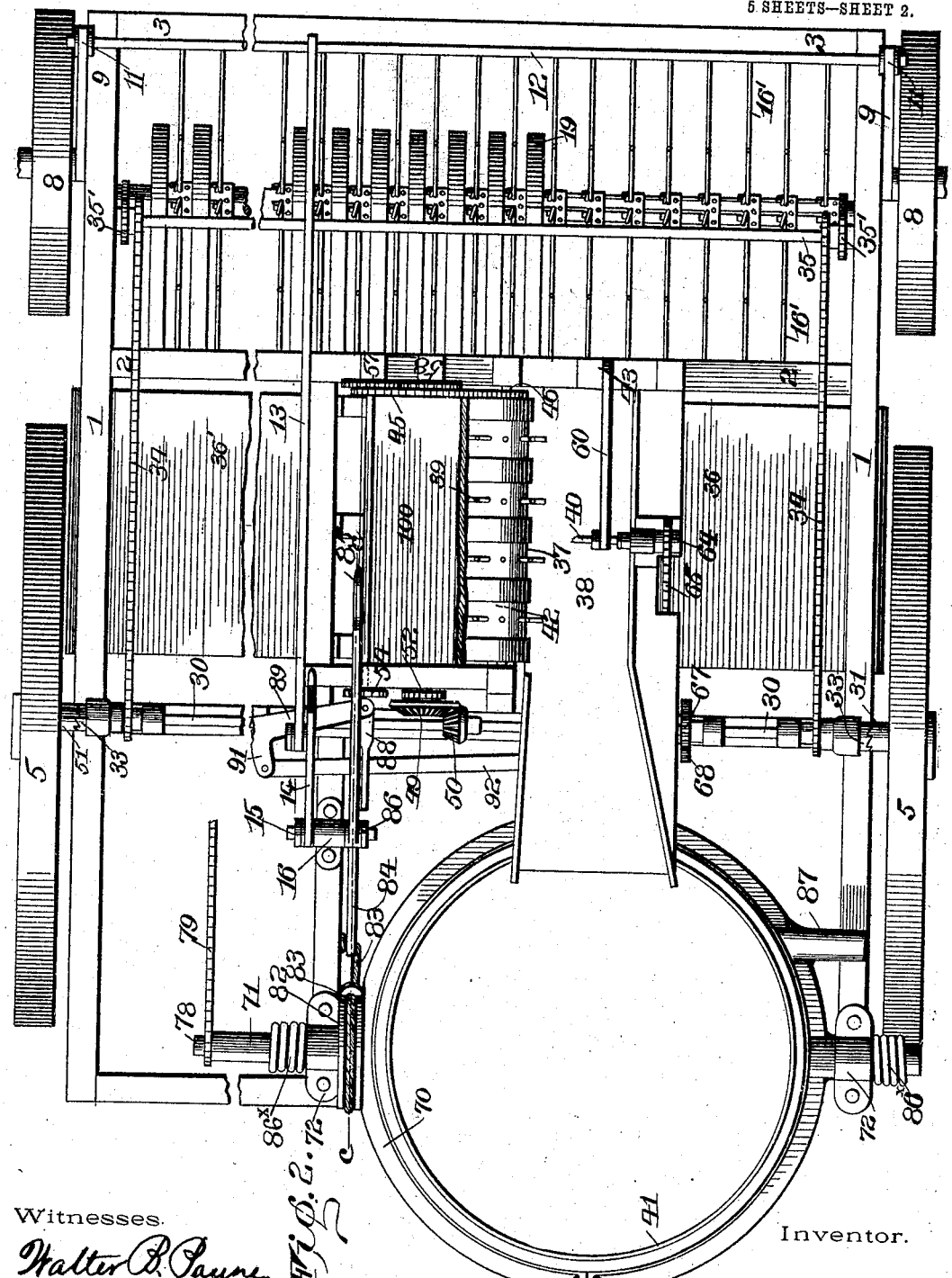

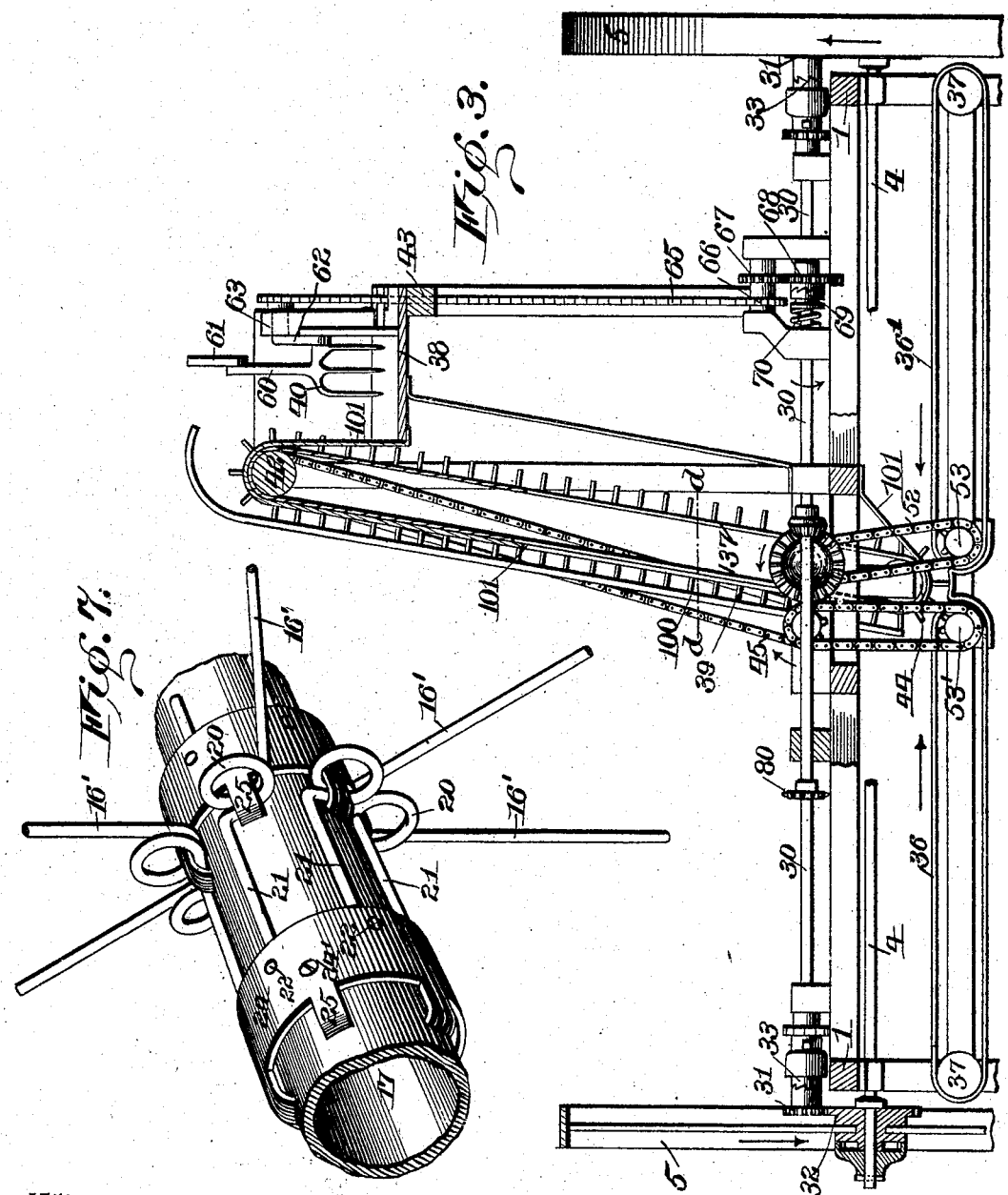

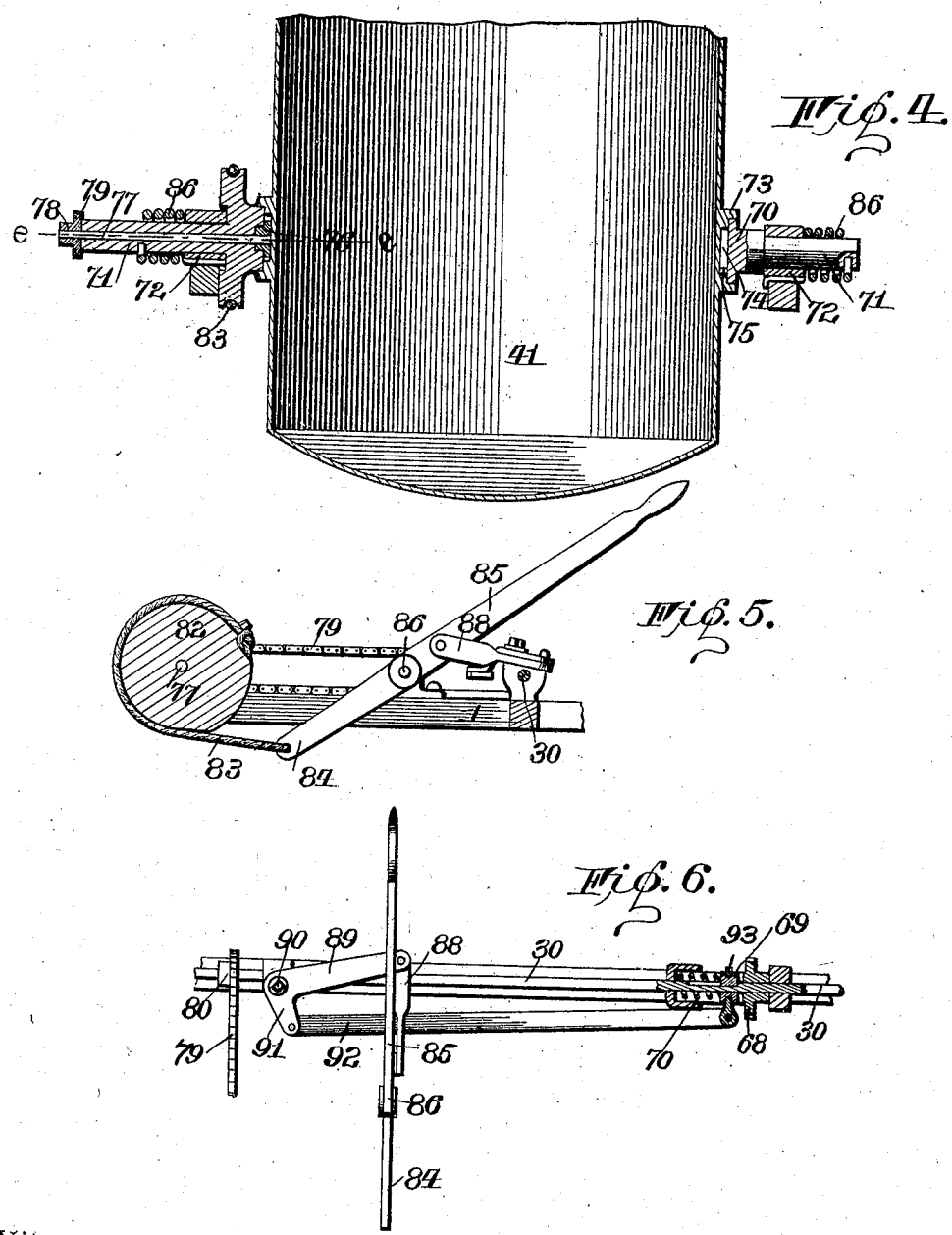

UNITED STATES PATENT OFFICE.

GEORGE M. DEPEW, OF CANANDAIGUA, NEW YORK.

MACHINE FOR GATHERING HAY, &c.

No. 806,069.　　　　Specification of Letters Patent.　　　　Patented Nov. 28, 1905.

Application filed March 1, 1902. Serial No. 96,225.

*To all whom it may concern:*

Be it known that I, GEORGE M. DEPEW, of Canandaigua, in the county of Ontario and State of New York, have invented certain new and useful Improvements in Machines for Gathering Hay; and I do hereby declare the following to be a full, clear, and exact description of the same, reference being had to the accompanying drawings, forming a part of this specification, and to the reference-numerals marked thereon.

My present invention has for its object to provide an improved form of apparatus adapted for raking and collecting grass, hay, or the like after the latter has been cut in the field; and it consists generally of a suitable raking device whereby the grass or hay is removed from the ground and mechanism for collecting it into a suitable receptacle from which it may be deposited after a desired amount is collected without interrupting the operation of the raking and collecting devices or in which it may be transported and deposited at any desired point, the raking device and other coöperating mechanism being controlled by suitable devices whereby they may be operated independently of the unloading mechanism.

To these and other ends the invention consists in certain improvements in construction and combinations of parts, all as will be hereinafter fully described, the novel features being pointed out in the claims at the end of this specification.

In the drawings, Figure 1 is a side elevation of an apparatus constructed in accordance with my invention. Fig. 2 is a top plan view thereof. Fig. 3 is a cross-sectional view on the line $a\ a$ of Fig. 1. Fig. 4 is a similar view on the line $b\ b$ of Fig. 2. Fig. 5 is a detail sectional view on the line $c\ c$ of Fig. 2. Fig. 6 is a detail view of the mechanism controlling the operation of the feeding-fork. Fig. 7 is a detail perspective view illustrating the manner of mounting the raking members upon their rotary supporting-shafts. Fig. 8 is a detail view illustrating the method of supporting the feeding-fork. Fig. 9 is a sectional view on the line $d\ d$ of Fig. 3. Fig. 10 is a sectional view on the line $e\ e$ of Fig. 1. Fig. 11 is a sectional view on the line $e\ e$ of Fig. 4.

Similar reference-numerals in the several figures indicate similar parts.

A machine constructed in accordance with my invention embodies a main frame or carriage consisting of the side portions 1, connected at their forward ends by cross-bars 2 and 3 and supported in suitable bearings through which extends the axle 4, carried in the wheels 5. Beneath the main frame and suspended upon the hangers 6 is a supplemental frame embodying the side portions 1'. The forward end of the frame is supported upon the wheels 8, and in order to permit its vertical adjustment relative the surface of the ground I mount these wheels in bearings carried at the end of bell-crank levers 9, pivoted at 10 to the portion 1' of the frame. The ends of the levers (indicated by 11) extend upwardly and are connected by means of a rod 12, upon which is a link 13, extending rearwardly and attached to an operating-lever 14, pivoted to a stud or short shaft 15 in a bearing 16 on the frame. By this arrangement it will be seen that when the lever 14 is moved rearwardly the bell-crank levers 11 will be operated to move the forward end of the frame upwardly, and by means of suitable locking devices (not shown) the frame may be supported either in the operative or inoperative position for purposes which will be further described.

The raking devices are mounted upon the forward end of the frame and embody a series of spring-fingers 16', extending radially from the shaft 17, carried in bearings 18 on the supplemental frame. The shaft is adapted to be revolved in the direction indicated by the arrow in Fig. 1, and the ends of the arms are preferably curved forwardly, as shown, in order that they may more readily engage and elevate the mown hay or grass. These spring-arms are arranged in a series of rows between the side portions of the frame, and between adjacent rows are provided stripping devices in the form of spring-loops 19, as shown in Figs. 1 and 2, said loops being attached to the frame and extending from the shaft 17 forwardly and upwardly, so that the hay or grass as it is elevated by the fingers 16' will be stripped or removed as the latter are revolved past the loops. In Fig. 7 I have illustrated the preferred method of securing the raking-fingers to the shaft, which consists in providing upon the inner end of each finger a spring-loop 20 and a laterally-extending end 21, provided with the outwardly-extending extremity 22. Arranged upon the shaft 17 are a series of collars 24, provided with apertures in which the ends 22 of one set of arms 16' are engaged and also having laterally-extending fingers 25, which are adapted to engage within the loops 20 of the adjacent set of arms. This construction is desirable, as it provides a simple arrangement for securing the raking-fingers, the collars being secured to the shaft by a single fastening, such as a bolt 24', and the spring-loops 20 on the fingers permitting the latter to give when necessary prevents their injury by contact with stones or similar objects.

The various mechanisms are operated primarily from the wheels 5; but in order that their operation may be controlled as desired I provide a driving-shaft 30, having at it ends pinions 31, coöperating with gears 32 on the wheels 5, and in order to provide for the independent movement of said wheels or the rearward movement of the frame or carriage suitable backing-ratchets 33 are provided between the shaft 30 and the pinions 31, as will be understood.

A rotary movement is imparted to the shaft 17 by means of the chains 34, operating over suitable sprocket-wheels on the shaft 30, and the counter-shaft 35, arranged near the forward end of the frame, which is connected with the shaft 17 by sprocket-chains 35'. The hay or the grass as it is removed by the strippers 19 is received upon suitable conveyer-belts 36 and 36', supported upon rollers 37 at the outer edges of the machine and upon similar rollers arranged at the center thereof and are adapted to be operated in the directions indicated by the arrows in Fig. 3, so that the material received thereon may be transported to the center of the machine, at which point it is elevated by means of an endless belt 137 and deposited upon an elevated platform 38, from which it is removed by means of a suitable hay-pitching device, such as a fork 40, into a suitable receptacle 41. The elevator-belt 137 is supported upon a roller 42 near the top of the upright frame 43, and at its lower end it passes around a roller 44. The belt is provided with spurs or projections 39, which engage the hay or grass as it is moved into contact therewith by the approaching surfaces 36 and 36', carrying it upward in a channel formed at one side by the wall 100 and at the other by bars or rods 101, lying upon the surface of the belt and extending over the roller 42, at which point they extend beyond the ends of the projections 39 to the platform to disengage the hay or grass from the belt. The elevator 137 is operated by means of a chain 45 passing over a sprocket-wheel 46 on the roller 42 and also coöperating with a sprocket-wheel 47 on a counter-shaft 56, supported in suitable bearings on the frame, said shaft being operated from a similar shaft 48, having at its forward end the gear 58, engaging the gear 57 on the shaft 56, and provided at its rear end with a bevel-gear 49, by means of which it is revolved through a bevel-pinion 50 on the shaft 30. Attached to the bevel-gear 49 is a sprocket-wheel 51, around which passes a sprocket-chain 52, coöperating with the sprocket-wheel 53 and operating the conveyer-belt 36', the corresponding conveyer-belt 36 being operated by a similar chain 54, passing around the sprocket-wheel 53' and engaging the sprocket-wheel 55 on the counter-shaft 56.

The hay-pitching device or fork 40 is supported above the platform 38 and is provided at its upper end with an arm or extension 60, to which is connected a link 61, pivoted to a portion of the frame 43, and the fork is operated to engage in rear of the hay deposited upon the platform to pitch it rearwardly by means of a crank-arm 62, mounted upon a shaft carried in a bearing 63, arranged at one side of the platform, said shaft being provided with a sprocket-wheel 64 and adapted to be operated by a chain 65, as shown in Figs. 1 and 3. As it is desired to give the fork a comparatively rapid movement, the chain 65 is operated by a sprocket-wheel 66, attached to a pinion 67, meshing with a gear 68 on the shaft 30, (see Fig. 3,) and as it is desirable to arrest the motion of the fork during certain operations of other portions of the mechanism the gear 68 is loosely mounted upon the shaft 30 and provided upon one side with ratchet-teeth, with which engages a ratchet member 69, carried upon said shaft and movable longitudinally thereof, but normally held in operative engagement with the gear 68 by means of the spring 70, suitable mechanism, as will be further described, being employed to shift the clutch member when it is desired to arrest the movement of the fork.

41 indicates the receptacle in which the grass or hay is collected, and it is preferably arranged at the rear of the frame or carriage. The receptacle may be cylindrical in form, as shown, and in order that the hay or grass may be evenly distributed therein it is revolubly mounted in an annular frame 70, at the opposite sides of which are provided trunnions 71, supported in the bearings 72 on the frame. A suitable track-plate is arranged upon the receptacle and is provided with the ways 73, engaging opposite sides of the frame 70 to secure the receptacle in position, and between the ways is provided a recess 74, at one side of which is arranged a circular rack-gear 75, with which engages a pinion 76, mounted upon the inner extremity of a shaft 77, journaled in one of the trunnions 71. This shaft is provided upon its outer end with a sprocket-wheel 78, which is connected by a chain 79 with the sprocket-wheel 80 on the driving-shaft 30. By this means the receptacle is revolved continuously in an upright position beneath the discharge end of the platform 38.

82 indicates a drum arranged on one of the trunnions 71, and secured thereto is a cable or other flexible connection 83, which is connected to the lower end 84 of an operating-lever 85, pivoted to the frame at 86 and adapted when moved in one direction to unwind the cable from the drum and cause the receptacle to be inverted to the position shown in dotted lines in Fig. 1, permitting its contents to be deposited on the ground. The receptacle is returned to its normal position by means of coiled springs 86$^x$, one end of each of which is attached to the trunnions 71 and the opposite end to the bearings 72 or other stationary portion of the frame, as will be understood.

87 indicates a lug or projection upon the annular frame 70, forming a stop which is adapted to engage the portion 1 of the frame to support the receptacle in its normal position when returned by the action of the springs 86.

It is not necessary to stop the machine in its onward movement while the receptacle is being inverted, as the raking devices and the conveyers and elevator may continue in operation and a quantity of hay and grass accumulated upon the platform 38 during said operation; but at such time it is desirable to arrest the movement of the feeding-fork. For this reason I attach to the lever 85 a short link 88, connected to the bell-crank lever 89, pivoted at 90, the arm 91 of said lever being connected by a rod or strap 92 with the yoke-frame 93, engaging the ratchet member 69, whereby the latter may be disconnected from the gear 68.

While I have not shown the usual pole or tongue, it will be understood that any suitable form of draft appliances may be provided at the forward end of the frame or carriage and connected in any suitable manner with the cross-bar 3.

An apparatus such as I have shown and described may be drawn by a team of horses, and the driver's seat or platform may be located on the frame or carriage in proximity to the operating or controlling levers 14 and 85, as will be understood. The arrangement of the parts is such that their weight is nearly balanced on the main axle 4, and it requires but little effort on the part of the operator to adjust the forward end of the frame to move the raking-arms into operative position relative to the surface of the ground. The hay or grass collected in the receptacle may be deposited in cocks or mounds upon the ground when the desired quantity has been collected while the machine is in motion, or the raking devices may be rendered inoperative and the receptacle transported to any desired point before depositing its contents. While I have shown the receptacle carried on the frame, it may be omitted and the conveying and elevating devices employed to load the hay into a separate wagon traveling at one side.

Various modifications of the device may be devised by those skilled in the art without departing from the spirit of my invention, and I do not desire, therefore, to confine my invention to the precise construction shown.

I claim as my invention—

1. In a machine for gathering hay, the combination with a frame, raking devices at one end thereof and a receptacle located at the other end, a platform located above the receptacle and between it and the raking devices, conveying devices receiving the hay from the rakes and transporting it to the platform and a fork pivotally mounted above the platform and adapted to move the hay delivered upon the latter into the receptacle, of devices for operating the latter to deposit its contents, driving mechanism for oscillating the fork and devices for arresting its movement controlled by the receptacle-operating devices and means for operating the conveying and raking devices.

2. In a machine for gathering hay, &c., the combination with a frame having rotary raking devices at its forward end and means for operating the latter, a receptacle located at the rear end of the frame and a platform arranged above the receptacle and between it and the raking devices of a conveyer adapted to receive the hay from the rakes, an elevator separate from and coöperating with the conveyer to move the hay to said platform, and a device arranged above the platform for pitching the hay from the platform into the receptacle.

3. In a machine for gathering hay, &c., the combination with a frame having rotary raking devices thereon, means for operating the latter, and a receptacle, of a platform arranged above the latter, a conveyer receiving the hay from the rakes, and an elevator for delivering it upon the platform, mechanism for operating the conveyer and elevator, a pitching device for moving the hay into the receptacle, and means for interrupting the operation of said pitching device.

4. In a machine for gathering hay, &c., the combination with a frame provided with the wheels and the driving-shaft operated thereby, raking devices on the frame, and driving connections between said devices and the shaft, of a receptacle revolubly mounted on the frame, and a platform arranged above the receptacle, a conveyer adapted to receive the hay from the rake, an elevator for delivering the hay upon the platform, and a fork operating above the platform to move the hay into the receptacle, and operating connections between said devices and the driving-shaft.

5. In a machine for gathering hay, &c., the combination with a frame having the wheels thereon, a driving-shaft operated thereby and raking devices mounted on the frame and operated by the shaft, of a receptacle, conveying and elevating devices for conducting the hay to a point above the receptacle, and a hay-pitching device for moving it into the latter, operating connections between the driving-shaft and the conveying and elevating devices and separate operating mechanism between the driving-shaft and pitching device, means for operating the receptacle to deposit its contents, and a controlling mechanism between said means and the operating mechanism for the pitching device.

6. In a machine for gathering hay, &c., the combination with a frame provided with wheels and a driving-shaft operated thereby, raking devices and a receptacle on the frame, of conveyers extending laterally on the frame and movable relatively toward each other, rotary driving devices therefor, a similar driving device arranged parallel with said devices and a vertically-extending conveyer operated thereby to elevate the hay to a point above the receptacle and driving connections between said conveyer-driving devices and the driving-shaft.

7. In a machine for gathering hay, &c., the combination with a frame provided with wheels and a driving-shaft operated thereby, raking devices and a receptacle on the frame, of conveyers extending laterally on the frame and movable relatively toward each other, rotary supports therefor, and an elevating-conveyer, a support therefor arranged in proximity to and parallel with the aforementioned supports and means for driving the conveyers operated by the driving-shaft.

8. In a machine for gathering hay, &c., the combination with a frame, raking devices and a receptacle thereon, of a laterally-moving conveyer, a rotary support therefor and an elevating-conveyer, a support for the latter arranged in proximity to and parallel with said rotary support, a channel leading from the first-mentioned conveyer to a point above the receptacle, pins or projections on the elevating-conveyer extending into the channel and means for operating said conveyer.

9. In a machine for gathering hay, &c., the combination with a frame having wheels thereon and a driving-shaft, supporting-wheels at one end of the frame, and adjusting devices between the latter and the supporting-wheels, of rotary raking devices journaled on the frame and operated from the driving-shaft, a receptacle pivotally mounted on the frame, and a platform arranged above the receptacle, conveying and elevating devices operated by said shaft adapted to receive the hay from the rakes and deposit it upon the platform, and a device for moving the hay into the receptacle, operating devices therefor, and a lever for tilting the receptacle and controlling the operation of the hay-moving device.

10. In a machine for gathering hay, &c., the combination with a frame, raking devices thereon, conveying and elevating mechanism, and a driving-shaft on the frame for operating the latter, of a support provided with the pivots journaled on the frame, a receptacle revolubly mounted in the support having a gear thereon, and a shaft journaled in one of the pivots of the support and having the pinion engaging the gear on the receptacle, operating connections between said shaft and driving-shaft, and a means for tilting the receptacle.

11. In a machine for gathering hay, &c., the combination with a frame provided with wheels and having a driving-shaft operated thereby, raking devices on the frame, and conveying and elevating devices operated by the driving-shaft, of a receptacle mounted upon trunnions journaled on the frame, springs secured to the latter and surrounding the trunnions and attached thereto for retaining the receptacle in its normal position, and a lever for tilting it upon the trunnions.

12. In a machine for gathering hay, &c., the combination with a frame provided with the wheels, and a driving-shaft, of a shaft operated therefrom and provided with raking-fingers arranged in rows, and a single clip on the shaft securing each row.

13. In a machine for gathering hay, &c., the combination with the frame, and a revoluble shaft journaled thereon, of raking-fingers extending radially of the shaft in rows and having laterally-extending inner ends, and clips on the shaft each adapted to secure the plurality of fingers in a separate row of one set of fingers and to engage the ends of the fingers in an adjacent row.

14. The combination with the main frame, of a hay-lifter thereon embodying a shaft having radially-extending spring-fingers provided with coils and laterally-extending ends, and collars on the shaft engaging said ends and provided with projections adapted to engage the coils to secure the arms to the shaft.

15. The combination with the main frame, of a hay-lifter thereon embodying a rotary shaft provided with fingers, arranged in rows and extending radially of the shaft having the loops at their inner ends and the laterally-extending portions, and collars on the shaft engaging said portions of one row of fingers and provided with projections engaging through the loops on an adjacent row of fingers.

GEORGE M. DEPEW.

Witnesses:
ROBERT F. THOMPSON,
FRANK A. CHRISTIAN.